(12) United States Patent
Gong et al.

(10) Patent No.: US 11,699,581 B2
(45) Date of Patent: Jul. 11, 2023

(54) SAMPLE FEED DEVICE

(71) Applicant: University of Science and Technology of China, Hefei (CN)

(72) Inventors: Bing Gong, Hefei (CN); Yongfei Zheng, Hefei (CN)

(73) Assignee: UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 164 days.

(21) Appl. No.: 17/485,847

(22) Filed: Sep. 27, 2021

(65) Prior Publication Data

US 2022/0013345 A1 Jan. 13, 2022

Related U.S. Application Data

(63) Continuation of application No. PCT/CN2020/072430, filed on Jan. 16, 2020.

(30) Foreign Application Priority Data

Jun. 21, 2019 (CN) .......................... 201910542627.2

(51) Int. Cl.
*H01J 49/04* (2006.01)
*G01N 30/72* (2006.01)

(52) U.S. Cl.
CPC ...... *H01J 49/0413* (2013.01); *G01N 30/7206* (2013.01)

(58) Field of Classification Search
CPC .......................... H01J 49/0413; G01N 30/7206
USPC ......................................................... 250/431
See application file for complete search history.

(56) References Cited

U.S. PATENT DOCUMENTS

| 4,332,639 | A | * | 6/1982 | Crosgrove | ........... | G21C 17/042 |
| | | | | | | 376/253 |
| 2009/0243159 | A1 | * | 10/2009 | Sun | ........................ | B29C 71/02 |
| | | | | | | 264/494 |
| 2013/0079262 | A1 | * | 3/2013 | Pol | ....................... | C10M 125/02 |
| | | | | | | 508/113 |

\* cited by examiner

*Primary Examiner* — Nicole M Ippolito
(74) *Attorney, Agent, or Firm* — WPAT, P.C.

(57) ABSTRACT

A sample feed device is provided, including: a body; a sample tray provided on the body; a moving part provided on the body and capable of reciprocating on the body, and the moving part provided with a transfer chamber, the transfer chamber capable of receiving a sample from the sample tray and transferring the sample to an analyzer with the movement of the moving part; a processing system provided on the body, and capable of performing helium gas purging and vacuum processing to the sample. The sample feed device may feed the sample automatically through relay transfer of the sample by the sample tray and the moving part. The processing system may perform the helium gas purging and vacuuming to the sample, which strips adsorbate on the surface of the sample by the helium gas purging, and removes the stripped adsorbate on the surface of the sample by vacuuming.

10 Claims, 1 Drawing Sheet

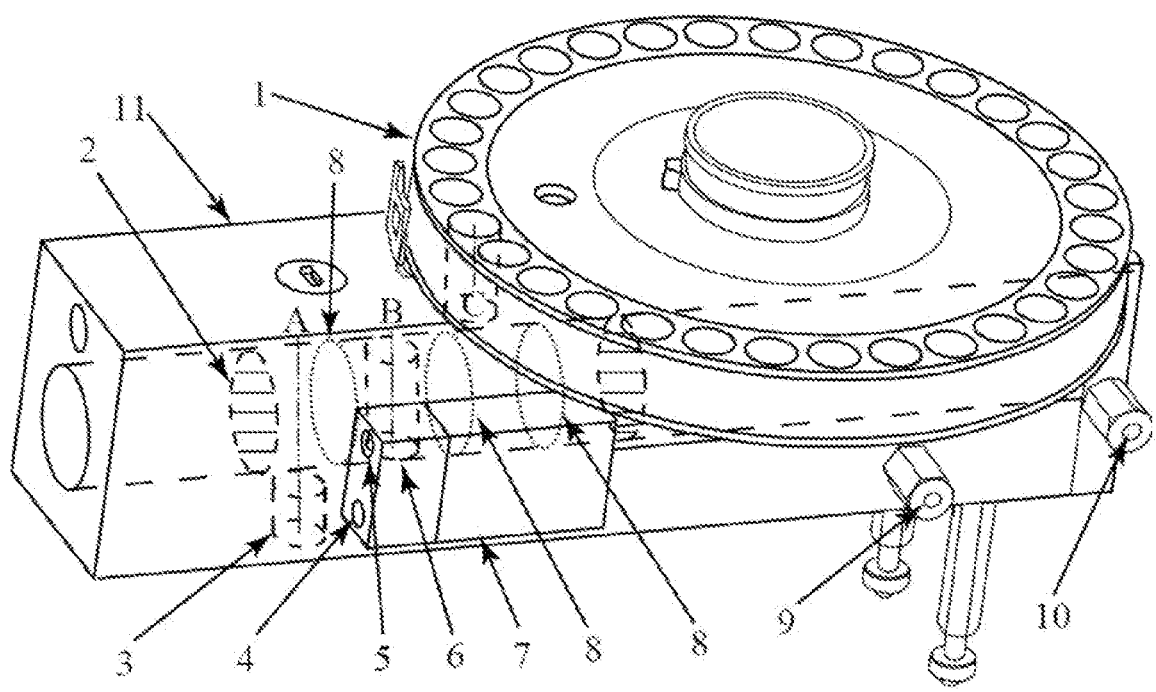

SAMPLE FEED DEVICE

TECHNICAL FIELD

The invention relates to the technical field of analytical instruments, and in particular, to a sample feed device.

BACKGROUND OF THE INVENTION

In the pretreatment of elemental analysis and isotope analysis, the sample feed device has a great impact on the accuracy and preciseness of the analysis. Therefore, it a very important to have a reasonably designed and efficient sample feed device in analyzing the element content and isotopic composition of the sample.

In the elemental analysis of a sample using an elemental analyzer, the sample is generally dropped directly into the elemental analyzer from the sample tray. Although the sample is provided with pretreatment such as high temperature baking, etc. before the analysis, it is difficult to fully remove the air and a small amount of moisture in the atmosphere absorbed on the surface of the sample, especially for powder samples. The impurities (i.e., air and moisture) adsorbed on the surface of the sample will directly affect the background of sample analysis. For samples with low element content, it will seriously affect the accuracy and sensitivity of the analysis.

SUMMARY OF THE INVENTION

In view of this, an objective of the invention is to provide a sample feed device, which significantly improves the accuracy and sensitivity of analyzing the sample in cooperation with an analyzer.

In order to achieve the above objective, the invention provides the following technical solution.

A sample feed device includes:

a body;

a sample tray provided on the body;

a moving part provided on the body and capable of reciprocating on the body, the moving part provided with a transfer chamber, the transfer chamber capable of receiving a sample sent from the sample tray and transferring the sample to an analyzer with the movement of the moving part; and a processing system provided on the body and capable of performing helium gas purging and vacuuming on the sample located in the transfer chamber.

Preferably, in the above-mentioned sample feed device, the moving part is a moving rod provided in an inner chamber of the body, and axially reciprocates in the inner chamber.

Preferably, in the above-mentioned sample feed device, the body is provided with a sample output hole thereon, which is located at the bottom of the moving part, and through which the sample may enter into a reaction tube of the analyzer from the transfer chamber.

Preferably, in the above-mentioned sample feed device, the transfer chamber is opened in the radial direction of the moving part and penetrates through the moving part, such that the sample on the sample tray is dropped into the transfer chamber when the transfer chamber is moved to a sample feed position, and the sample in the transfer chamber is dropped into the sample output hole when the transfer chamber is moved to a sample output position.

Preferably, in the above-mentioned sample feed device, the processing system includes a helium gas pipe, a vacuuming pipe, and a solenoid valve, and when the transfer chamber is moved to a processing position, the helium gas pipe and the vacuuming pipe are communicated alternatively with the transfer chamber, and the solenoid valve is communicated with the vacuuming pipe and the helium gas pipe through a vacuum interface and a helium gas interface, respectively, to control the on-off of the vacuuming pipe and the helium gas pipe.

Preferably, in the above-mentioned sample feed device, in the axial direction of the moving part, the processing position is located between the sample feed position and the sample output position.

Preferably, in the above-mentioned sampling device, the moving part is provided with a plurality of seal rings sleeved thereon, all of which sealingly connect the circumferential outer wall of the moving part and the inner wall of the inner chamber, and are respectively located on both sides of the transfer chamber, such that the transfer chamber is kept air tight when communicating with the helium gas pipe and the vacuuming pipe.

Preferably, in the above-mentioned sample feed device, the sample tray is rotatably disposed on the body, and the body is provided with a first compressed air inlet, through which the compressed air enters to drive the sample tray to rotate.

Preferably, in the above-mentioned sample feed device, the body is provided with a second compressed air inlet, through which the compressed air enters to drive the moving part to reciprocate.

Preferably, in the above-mentioned sample feed device, a vacuum gauge is provided in the transfer chamber.

The sample feed device provided by the invention may feed the sample automatically through the relay transfer of the sample by the sample tray and the moving part. In addition, in the process of transferring the sample by the moving part, it may perform the helium gas purging and vacuuming to the sample by the processing system, which removes the air absorbed by the sample by the helium gas purging, and removes the water absorbed by the sample by vacuuming, so as to minimize the background of the analysis, and significantly improve the accuracy and sensitivity of elemental analysis and isotope analysis.

BRIEF DESCRIPTION OF THE DRAWING

In order to more clearly explain embodiments of the invention or the technical solutions in the prior art, the drawing used in the description of the embodiments or the prior art will be briefly introduced below. Obviously, the drawing in the following description is merely embodiments of the invention. For those of ordinary skill in the art, other drawings may be obtained according to the provided drawing without creative efforts.

The FIGURE is a schematic structural diagram of a sample feed device according to an embodiment of the invention.

REFERENCE NUMERALS

1—sample tray, 2—moving part, 3—sample output hole, 4—vacuum interface, 5—helium gas interface, 6—transfer chamber, 7—solenoid valve, 8—seal ring, 9—first compressed air inlet, 10—second compressed air inlet, 11—body.

DETAILED DESCRIPTION OF EMBODIMENTS

The invention provides a sample feed device, which significantly improves the accuracy and sensitivity of analyzing a sample in cooperation with an analyzer.

The technical solutions in embodiments of the invention will be clearly and completely described in the following with reference to the drawing in the embodiments of the invention. It is apparent that the described embodiments are only a part of embodiments of the invention, but not all of embodiments of the invention. Based on the illustrated embodiments of the invention, all other embodiments obtained by a person of ordinary skill in the art without creative efforts shall fall within the protection scope of the invention.

As shown in the FIGURE, an embodiment of the invention provides a sample feed device configured for working with an analyzer. The sample feed device mainly includes: a body 11; a sample tray 1 provided on the body 11, the sample tray 1 used to temporarily contain a weighed sample for analysis; a moving part 2 provided on the body 11 and capable of reciprocating on the body 11, the moving part 2 provided with a transfer chamber 6 thereon, the transfer chamber 6 receiving a sample sent from the sample tray 1, and capable of transferring the sample to an analyzer with the movement of the moving part 2 to realize the transfer of the sample to the analyzer; a processing system provided on the body 11 and capable of performing helium gas purging and vacuuming on the sample located in the transfer chamber 6.

The above-mentioned sample feed device may perform helium gas purging and vacuuming on the sample located in the transfer chamber 6 through the processing system during the transfer process of the sample, thereby removing impurities such as air and moisture adsorbed by the sample, such that the accuracy and sensitivity of elemental analysis and isotope analysis of the sample may be greatly improved.

In order to further optimize the technical solution, as shown in the FIGURE, in the sample feed device provided in this embodiment, the moving part 2 is a moving rod provided in the inner chamber of the body 11 and reciprocates axially in the inner chamber. The moving part 2 is selected as a rod-shaped part and disposed inside the body 11, which may not only simplify the structure of the sample feed device to reduce its volume, but also makes it easier to close the transfer chamber 6 air tight by making easier cooperation between the inner chamber and the moving rod, which makes this structure the preferred structure of this embodiment. In addition, on the premise of ensuring normal operation, the moving part 2 may also be disposed outside the body 11.

As shown in the FIGURE, a sample output hole 3 is provided on the body 11, and preferably, the sample output hole 3 is located at the bottom of the moving part 2, and the sample may enter into the reaction tube of the analyzer through the sample output hole 3 from the transfer chamber 6. In this embodiment, the structure in which the sample enters into the analyzer from the sample feed device is preferably the sample output hole 3 opened on the body 11 and capable of communicating with the transfer chamber 6 (also a special tube may be provided for communicating the transfer chamber 6 with the reaction tube of the analyzer). This structure may simplify the overall structure of the sample feed device, and also providing the sample output hole 3 at the bottom of the moving part 2 may also make the sample drop directly into the reaction tube by its own weight when the transfer chamber 6 is in communication with the sample output hole 3, thereby eliminating the need to provide a special driving component, which reduces the manufacturing cost of the sample feed device and improves its working performance.

As shown in the FIGURE, in this embodiment, it is also preferred that the transfer chamber 6 is opened in the radial direction of the moving part 2 and penetrates through the moving part 2 such that the sample on the sample tray 1 is dropped into the transfer chamber 6 when the transfer chamber is moved to the sample feed position (i.e., the position marked C in the FIGURE), and that the sample in the transfer chamber 6 is dropped into the sample output hole 3 when the transfer chamber 6 is moved to the sample output position (i.e., the position marked A in the FIGURE). Opening the transfer chamber 6 in the radial direction of the moving part 2 facilitates the cooperation of the moving part 2 with the sample tray 1 at the top and the sample output hole 3 at the bottom. This means that during the transfer process of the sample, when the transfer chamber 6 is moved to the sample feed position with the movement of the moving part 2, as the transfer chamber 6 is aligned with the sample tray 1 at this time, the sample on the sample tray 1 may directly fall into the transfer chamber 6 from the entrance at the top of the transfer chamber 6. When the transfer chamber 6 is moved to the sample output position by moving of the moving part 2, the outlet at the bottom of the transfer chamber 6 is aligned with and communicated to the sample output hole 3, such that the sample in the transfer chamber 6 may directly fall into the sample output hole 3 through the outlet at the bottom and finally into the reaction tube of the analyzer.

In this embodiment, the preferred processing system includes a helium gas pipe, a vacuuming pipe, and a solenoid valve 7, as shown in the FIGURE. When the transfer chamber 6 is moved to the processing position, the helium gas pipe and the vacuuming pipe communicate with the transfer chamber 6 alternatively, and the solenoid valve 7 communicates with the vacuuming pipe and the helium gas pipe through a vacuum interface 4 and a helium gas interface 5, respectively, to control the on-off of the vacuuming pipe and the helium gas pipe. In addition, the helium gas pipe is externally connected with a high-purity helium gas source, and the vacuuming pipe is externally connected with a vacuum dry pump. When the transfer chamber 6 moves to the sample feed position to receive the sample, the moving part 2 will move the sample located in the transfer chamber 6 to the sample output position. During this movement, the transfer chamber 6 will first move to the sample processing position (i.e. the position marked B in the FIGURE), such that the helium gas pipe and the vacuuming pipe communicate with the transfer chamber 6 to perform sample processing to the sample in the transfer chamber 6. During the processing, the helium gas pipe is first communicated with the transfer chamber 6 through the solenoid valve 7, such that the helium gas is purged to the sample by introducing helium gas into the transfer chamber 6. After the purging is completed, the helium gas pipe is disconnected through the solenoid valve 7, and the solenoid valve 7 then controls the vacuuming pipe to communicate with the transfer chamber 6, to vacuum the transfer chamber 6 under the vacuuming action of the vacuum dry pump to remove the air in the transfer chamber 6 and the gas (including air and moisture) adsorbed on the surface of the sample. After that, the vacuuming pipe is disconnected by the solenoid valve 7. The above helium gas purging and vacuuming are performed 4-6 times alternately, and the vacuum degree in the transfer chamber 6 is detected by a vacuum gauge. When the vacuum degree reaches $10^{-2}$-$10^{-3}$ mbar, the air and water adsorbed on the surface of the sample may basically be considered as been completely processed. The processing operation then completes. After that, the sample from which impurities have been removed moves to the sample output position and enters into the sample output hole 3.

As shown in the FIGURE, in the axial direction of the moving part 2, the processing position is preferably located between the sample feed position and the sample output position. This arrangement allows the sample in the transfer chamber 6 to pass through the processing position during its approaching to the sample output position, which prevents the increase in the moving distance of the moving part 2 because the processing position is disposed on the same side as the sample feed position and the sample output position, such that the working performance of the sample feed device may be improved.

Furthermore, in this embodiment, it is also preferable that the moving part 2 is provided with a plurality of seal rings 8 sleeved thereon, as shown in the FIGURE. The seal rings 8 are all sealingly connect the circumferential outer wall of the moving part 2 and the inner wall of the inner chamber of the body 1, and are also respectively located on two sides of the transfer chamber 6 such that the transfer chamber 6 is kept air tight when it communicates with the helium gas pipe and the vacuuming pipe. Since it is necessary to ensure the air tightness of the transfer chamber 6 when processing the sample in the transfer chamber 6, a seal ring 8 is provided between the circumferential outer wall of the moving part 2 and the inner wall of the inner chamber of the body 11. The sealing through the seal ring 8 keeps the transfer chamber 6 an air tight space when it is not located in the sample feed position or the sample output position, which ensures the smooth progress of helium gas purging and the vacuuming. In addition, the sealing of the transfer chamber 6 may also be achieved by other methods, for example, proving a sealing door that can open and close at the entrance at the top and the outlet at the bottom of the transfer chamber 6. In addition, in this embodiment, three seal rings 8 are preferred, as shown in the FIGURE.

Specifically, as shown in the FIGURE, the sample tray 1 is rotatably disposed on the body 11, and the body 11 is further provided with a first compressed air inlet 9. The compressed air entering from the first compressed air inlet 9 is used to drive the sample tray 1 to rotate. At the same time, the body 11 is provided with a second compressed air inlet 10, and the compressed air entering from the second compressed air inlet 10 is used to drive the moving part 2 to reciprocate. That is, both the reciprocating movement of the moving part 2 and the rotation of the sample tray 1 in this embodiment are preferably achieved by the drive of the compressed air. In addition, the movement of the moving part 2 and the sample tray 1 may also be driven by other types of driving methods, such as driving by a motor, a cylinder, a hydraulic cylinder, and the like.

In this embodiment, a vacuum gauge is preferably provided in the transfer chamber 6 such that the condition of sample processing may be monitored by the vacuum gauge, in order to minimize the background of the analysis. In addition, the status of sample processing may also be monitored by other monitoring methods, such as providing a vacuum gauge, flow meter, etc. on the vacuuming pipe.

The following describes the specific working process of the sample feed device by taking the analysis of the carbon content in the mineral and the analysis of the water content and isotopic composition in the mineral as examples.

When analyzing the content of carbon in mineral, the sample is baked at first. For inorganic sample, the baking temperature may be appropriately increased, generally 150° C.-200° C., and the baking time is 24 hours. For organic sample, the baking temperature is generally set to 80° C.-120° C., and the baking time is 12 hours. After that, the sample is accurately weighed and wrapped in a high-purity tin cup. The weighed sample is then placed in the sample tray 1, which rotates such that the sample falls into the transfer chamber 6 in the sample feed position. The transfer chamber 6 is then moved to the processing position, where then under the control of the solenoid valve 7, the sample is alternately helium gas purged and vacuumed. By using a vacuum gauge, when the vacuum degree of the transfer chamber 6 reaches 10−2 mbar, it may be considered that the impurities adsorbed by the sample are basically removed. The transfer chamber 6 is then moved to the sample output position, where the sample falls into the oxidation-reduction reaction tube under the helium gas atmosphere for reaction. The exhaust gas is separated by the GC column. The content of carbon element in the mineral may be obtained based on the amount of carbon dioxide.

When analyzing the water content and H isotope composition in mineral, the sample is first baked. For water-containing mineral, the baking temperature is 100° C.-120° C., and the baking time is 6 hours. For nominally anhydrous mineral (that is, no water in the molecular formula), baking temperature is 120° C.-150° C., and baking time is 8 hours. The sample is then accurately weighed and wrapped in a high-purity silver cup. The weighed sample is then placed in the sample tray 1, which rotates such that the sample falls into the transfer chamber 6 located at the sample feed position. As the water adsorbed on the surface of the sample is difficult to remove, the temperature in the transfer chamber 6 needs to be set to 100° C. The transfer chamber 6 is then moved to the processing position, where under the control of the solenoid valve 7, the sample is alternately helium gas purged and vacuumed. As the water adsorbed on the surface of the sample is more difficult to remove, it is desirable to prolong the time for the helium gas purging and vacuuming. By using a vacuum gauge, when the vacuum degree of the transfer chamber 6 reaches 10−2 mbar, it may be considered that the impurities adsorbed by the sample are basically removed. The transfer chamber 6 is then moved to the sample output position, where the sample falls into the carbon reduction furnace in the helium gas atmosphere. The exhaust gas passes through the GC Column for separation, and then into the isotope gas mass spectrometer. The water content and H isotope composition of the mineral may be calculated according to the peak area of hydrogen.

In summary, the sample feed device provided in this embodiment may have the following advantages over the conventional sample feed device:

(1) Higher accuracy of analysis. The effect of adsorbed impurities on the analysis is basically removed by helium purging and vacuuming the sample before the sample feed. Compared with the traditional operation methods, the analysis accuracy may be improved by an order of magnitude.

(2) Higher sensitivity of analysis. The traditional operation method is often unable to measure the sample with very low content due to the influence of adsorbed impurities. The sample feed device provided in this embodiment may successfully provide zero background and greatly improve sensitivity of the analysis.

This description describes, the structure of each part in a progressive manner, and focuses on its differences from the existing structure. The overall and partial structure of the sample feed device may be obtained by combining the structures of the above multiple parts.

The above description of the disclosed embodiments enables those skilled in the art to implement or use the invention. Various modifications to these embodiments will be apparent to those skilled in the art, and the general principles defined herein may be implemented in other embodiments without departing from the spirit or scope of the invention. Therefore, the invention will not be limited to the embodiments shown herein, but should conform to the widest scope consistent with the principles and novel features disclosed herein.

What is claimed is:

1. A sample feed device, comprising:
   a body;
   a sample tray provided on the body;
   a moving part provided on the body and configured to reciprocate on the body, wherein the moving part is provided with a transfer chamber, and the transfer chamber is configured to receive a sample sent from the sample tray and transfer the sample to an analyzer along with a movement of the moving part; and
   a processing system provided on the body and configured to perform helium gas purging and vacuuming on the sample located in the transfer chamber.

2. The sample feed device according to claim 1, wherein the moving part is a moving rod provided in an inner chamber of the body, and axially reciprocates in the inner chamber.

3. The sample feed device according to claim 2, wherein the body is provided with a sample output hole thereon, the sample output hole is located at the bottom of the moving part, and configured to allow the sample to enter into a reaction tube of the analyzer from the transfer chamber after passing through the sample output hole.

4. The sample feed device according to claim 3, wherein the transfer chamber is opened in a radial direction of the moving part and penetrates through the moving part, such that: the sample on the sample tray is dropped into the transfer chamber when the transfer chamber is moved to a sample feed position, and the sample in the transfer chamber is dropped into the sample output hole when the transfer chamber is moved to a sample output position.

5. The sample feed device according to claim 4, wherein the processing system comprises a helium gas pipe, a vacuuming pipe, and a solenoid valve; and when the transfer chamber is moved to a processing position, the helium gas pipe and the vacuuming pipe are communicated alternately with the transfer chamber, and the solenoid valve is communicated with the vacuuming pipe through a vacuum interface and communicated with the helium gas pipe through a helium gas interface, to control on-off states of the vacuuming pipe and the helium gas pipe.

6. The sample feed device according to claim 5, wherein in an axial direction of the moving part, the processing position is located between the sample feed position and the sample output position.

7. The sample feed device according to claim 5, wherein the moving part is provided with a plurality of seal rings sleeved thereon; all of the plurality of seal rings sealingly connect a circumferential outer wall of the moving part and an inner wall of the inner chamber, and are located on two opposite sides of the transfer chamber, such that the transfer chamber is kept air tight when the transfer chamber is communicated with the helium gas pipe and the vacuuming pipe.

8. The sample feed device according to claim 2, wherein the sample tray is rotatably disposed on the body, the body is provided with a first compressed air inlet, and the first compressed air inlet is configured to allow compressed air to enter to drive the sample tray to rotate.

9. The sample feed device according to claim 2, wherein the body is provided with a second compressed air inlet, and the second compressed air inlet is configured to allow compressed air enter to drive the moving part to reciprocate.

10. The sample feed device according to claim 1, wherein the transfer chamber is provided with a vacuum gauge therein.

* * * * *